US006767173B1

(12) United States Patent
Sunila

(10) Patent No.: US 6,767,173 B1
(45) Date of Patent: Jul. 27, 2004

(54) COMPACT TAILGATE LIFTER

(76) Inventor: Raymond Scott Sunila, W202N10110 Lannon Rd., Colgate, WI (US) 53017

( * ) Notice: Subject to any disclaimer, the term of this patent is extended or adjusted under 35 U.S.C. 154(b) by 70 days.

(21) Appl. No.: 10/268,228

(22) Filed: Oct. 10, 2002

Related U.S. Application Data

(63) Continuation-in-part of application No. 09/565,756, filed on May 5, 2000, now abandoned.

(51) Int. Cl.[7] .................... B60P 1/26

(52) U.S. Cl. .................... 414/519; 296/56; 298/23 MD

(58) Field of Search .................... 414/519, 520; 298/23 MD, 23 R; 296/56, 184; 49/340, 344

(56) References Cited

U.S. PATENT DOCUMENTS

| | | | | |
|---|---|---|---|---|
| 2,246,358 A | * | 6/1941 | Jelinek et al. | 16/366 |
| 3,272,552 A | | 9/1966 | Park | 296/56 |
| 3,559,830 A | * | 2/1971 | Toppins | 414/493 |
| 3,830,542 A | | 8/1974 | La Blanche | 296/56 |
| 3,860,288 A | | 1/1975 | Martin et al. | 298/23 |
| 3,869,168 A | | 3/1975 | Matheson | 296/56 |
| 4,051,746 A | * | 10/1977 | Liljeros | 74/520 |
| 4,212,427 A | * | 7/1980 | Grant | 239/676 |
| 4,699,428 A | | 10/1987 | Vick | 298/23 MD |
| 4,989,918 A | | 2/1991 | Biddy | 298/23 MD |
| 5,018,687 A | * | 5/1991 | Kupfernagel et al. | 244/129.5 |
| 6,193,295 B1 | * | 2/2001 | Stragier | 296/56 |

* cited by examiner

*Primary Examiner*—James Keenan
(74) *Attorney, Agent, or Firm*—Donald J. Ersler

(57) ABSTRACT

The compact tailgate lifter includes a pair of lifting assemblies. A first lifting assembly is attached to one side wall of a dump box. A second lifting assembly is attached to the other side wall of the dump box. The first and second lifting assemblies are attached to opposing ends of a tailgate. Each lifting assembly includes a base, pivot arm, tailgate plate, actuation device, and a plurality of pins. The tailgate plate is removably retained within the pivoting arm. A rear of the pivoting arm is pivotally attached to a rear of the base. One end of the actuation device is pivotally attached to a rear of the base and the other end thereof is pivotally attached to a front of the pivoting arm. Extension of each actuation device will lift the tailgate.

13 Claims, 5 Drawing Sheets

COMPACT TAILGATE LIFTER

CROSS-REFERENCES TO RELATED APPLICATIONS

This is a continuation-in-part application of Ser. No. 09/565,756 filed on May 5, 2000, now abandoned.

BACKGROUND OF THE INVENTION

1. Field of the Invention

The present invention relates generally to trucks with tailgates and more specifically to a compact tailgate lifter which may be installed on nearly any truck with a dump box.

2. Discussion of the Prior Art.

There are several patents which disclose tailgate lifting mechanisms. The drawback to most of these designs is the amount of room needed for the tailgate lifting mechanism. Many times, the mechanism will result in the width of the dump box being reduced to accommodate the lifting mechanism. A smaller dump box means a smaller load is carried. In some cases, the moving parts of the tailgate lifting mechanism are exposed when the tailgate is down. Further, most of these mechanisms are not easily installed on a truck which doesn't have a lifting mechanism.

Accordingly, there is a clearly felt need in the art for a compact tailgate lifter which is compact in size and may be easily attached to nearly any truck with or without a tailgate.

SUMMARY OF THE INVENTION

The present invention provides a compact tailgate lifter which may be easily installed on nearly any truck with or without a tailgate. The compact tailgate lifter includes a pair of lifting assemblies. A first lifting assembly is attached to a top of a first side wall of a dump box. A second lifting assembly is attached to a top of a second side wall of the dump box. The first and second lifting assemblies are attached to opposing ends of a tailgate. Each lifting assembly includes a base, pivot arm, tailgate plate, actuation device, and a plurality of pins. The actuation device is preferably a hydraulic cylinder, but could be a pneumatic or electric cylinder. The tailgate plate is retained within the pivoting arm with a removable pin. A rear of the pivoting arm is pivotally attached to a rear of the base. A first pivot tube is attached to an end of the hydraulic cylinder rod. A second pivot tube is attached to a rear end of the hydraulic cylinder. The inner diameter of the first and second pivot tubes are sized to receive a pivot pin.

A first bore is formed through the pivot arm at front thereof. A first pivot pin is inserted through the first bore and the first pivot tube to pivotally retain the hydraulic cylinder in relation to the pivoting arm. A second bore is formed through a side of the base at a rear thereof. A second pivot pin is inserted through the second bore and the second pivot tube to pivotally retain the hydraulic cylinder in relation to the base. Extension of the hydraulic cylinder will lift the tailgate. Extension of the hydraulic cylinder may be controlled with a solenoid operated hydraulic valve and an electrical switch. Hydraulic fluid is tapped off the hydraulic system of the truck. The hydraulic valve diverts hydraulic fluid from the hydraulic ram into the hydraulic cylinder. To lower the tailgate, the electrical switch is placed in a down position and the hydraulic fluid flows out of the hydraulic cylinder into a reservoir.

Accordingly, it is an object of the present invention to provide a compact tailgate lifter which may be easily installed.

Finally, it is a further object of the present invention to provide a compact tailgate lifter which fits on nearly every truck with or without a tailgate.

These and additional objects, advantages, features and benefits of the present invention will become apparent from the following specification.

DETAILED DESCRIPTION OF THE PREFERRED EMBODIMENTS

Figure 1:
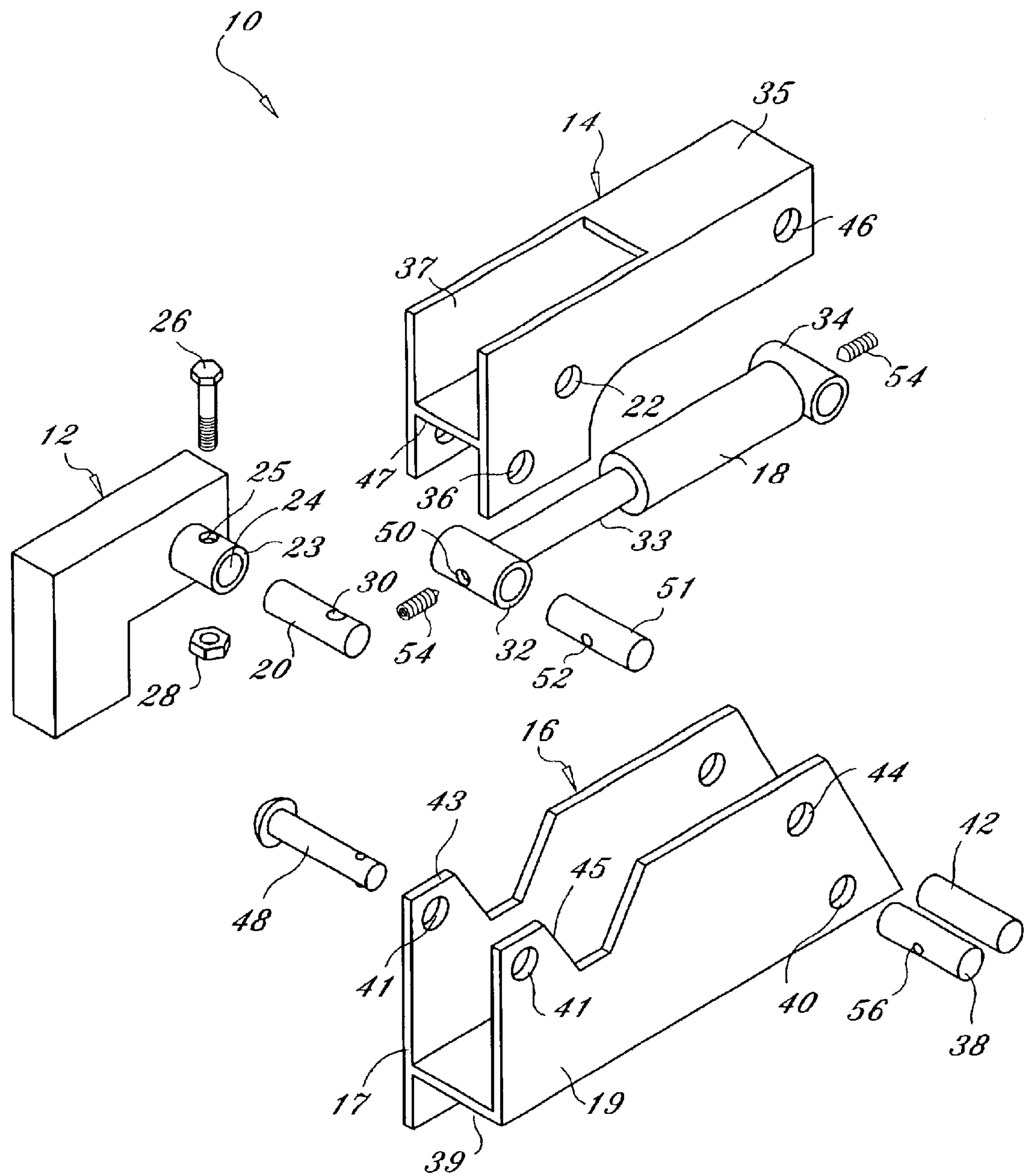
FIG. 1 is an exploded perspective view of a compact tailgate lifter in accordance with the present invention.
Figure 2:
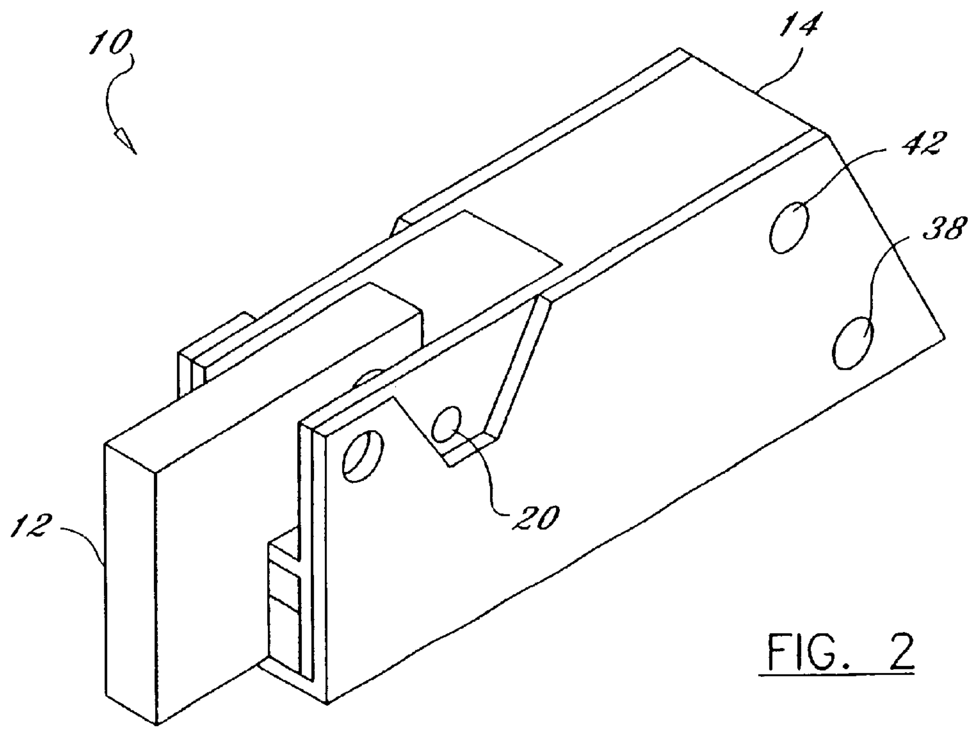
FIG. 2 is a perspective view of a closed compact tailgate lifter in accordance with the present invention.
Figure 3:
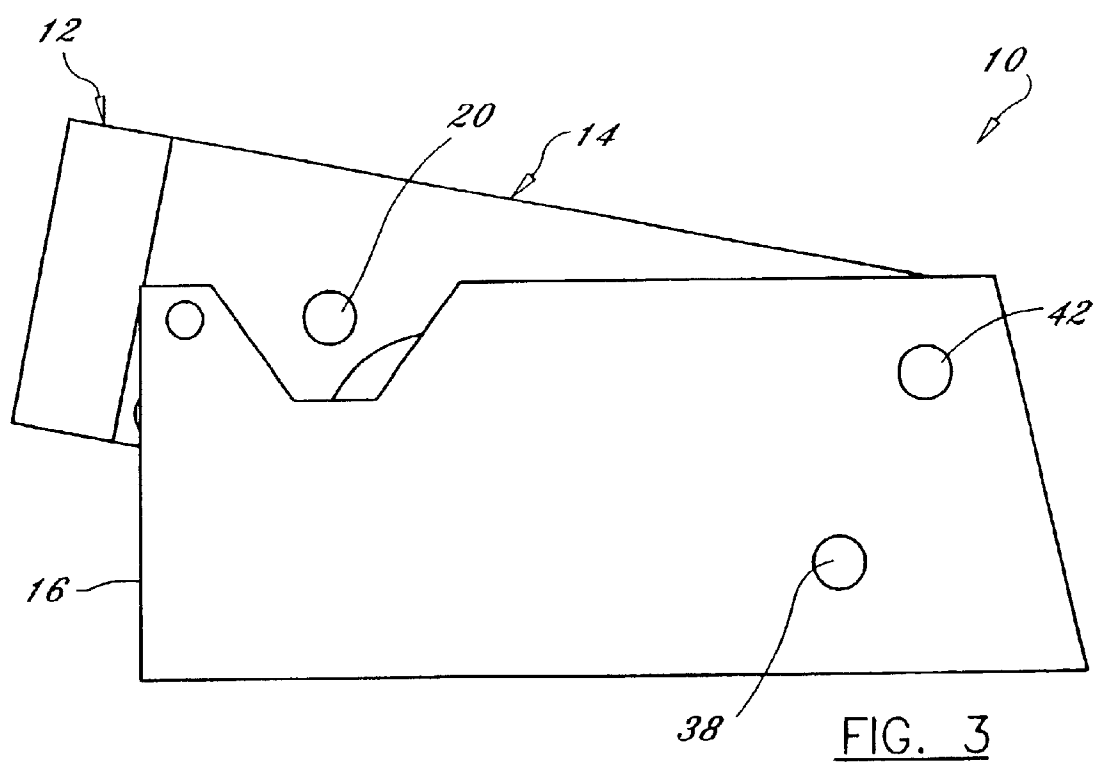
FIG. 3 is a side view of a compact tailgate lifter with a pivot arm partially lifted in accordance with the present invention.
Figure 4:
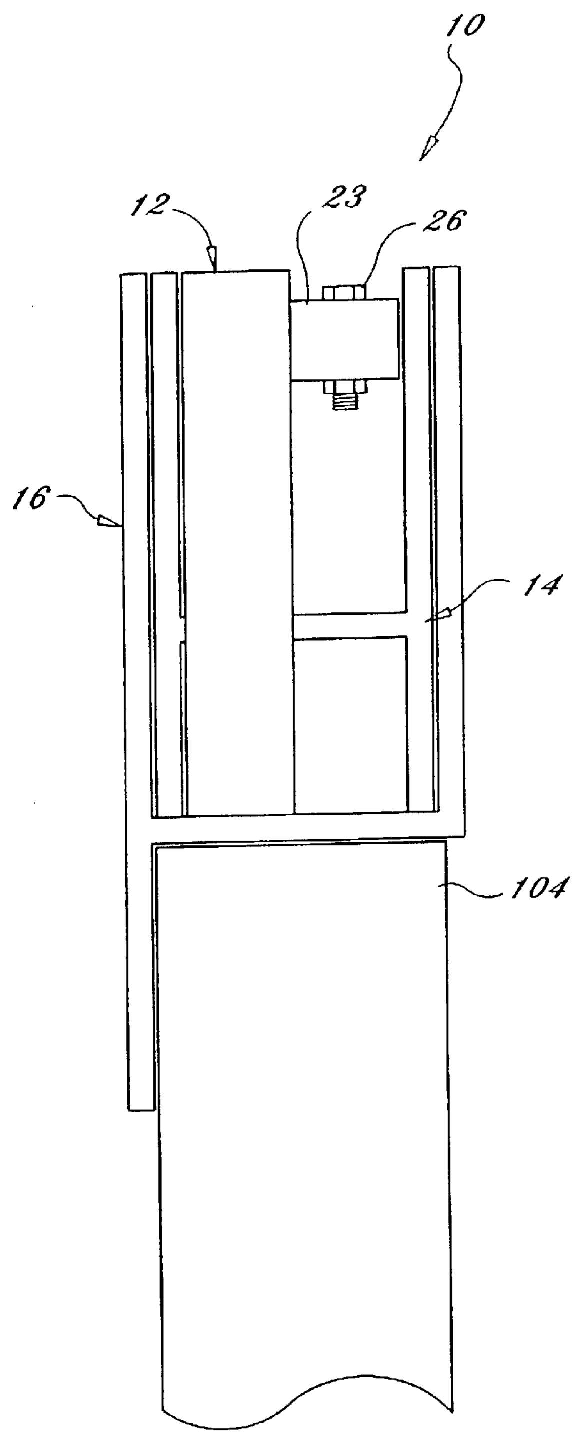
FIG. 4 is a front view of a compact tailgate lifter in accordance with the present invention.
Figure 5:
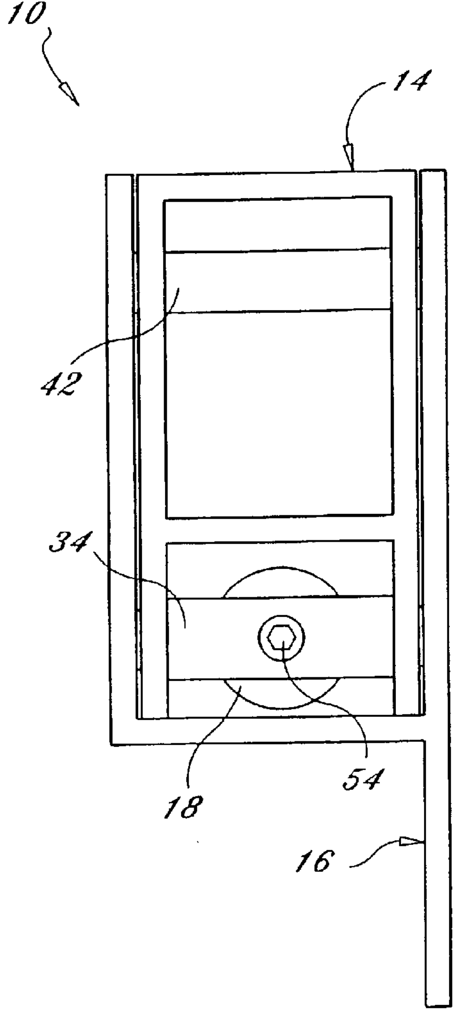
FIG. 5 is a rear view of a compact tailgate lifter in accordance with the present invention.
Figure 6:
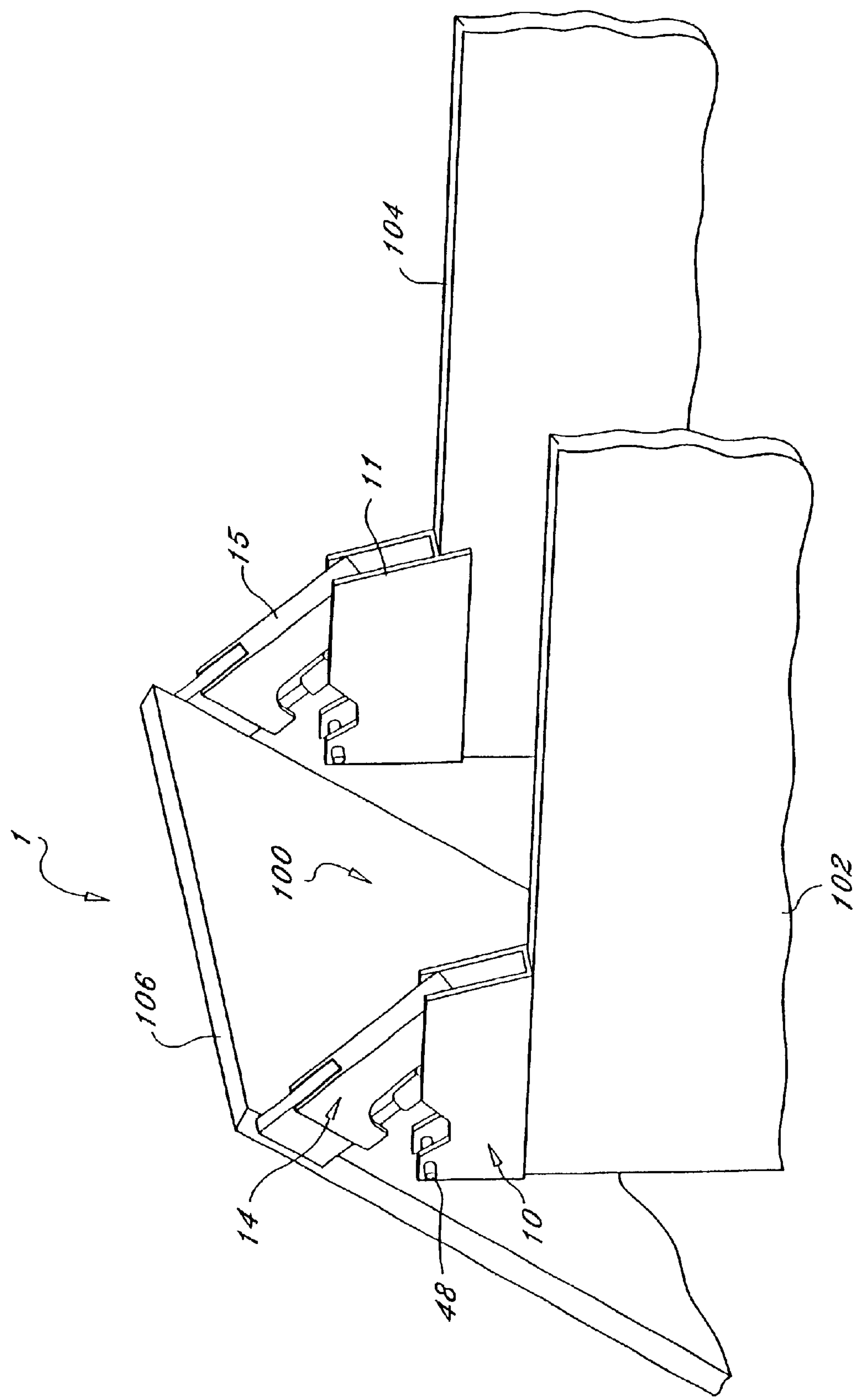
FIG. 6 is a rear perspective view of two compact tailgate lifters lifting a tailgate in accordance with the present invention.

With reference now to the drawings, and particularly to FIG. 1, there is shown an exploded perspective view of a compact tailgate lifter 1. With reference to FIGS. 2–6, the compact tailgate lifter 1 includes a pair of lifting assemblies. Preferably, a bottom of a first lifting assembly 10 is attached to a top of a first side wall 102 of a dump box 100. Preferably, a bottom of a second lifting assembly 11 is attached to a top of a second side wall 104 of the dump box 100. A first pivot arm 14 is attached to one end of the tailgate 106 and a second pivot arm 15 is attached to the other side thereof. Actuation of the hydraulic cylinders in the first and second lifting assemblies raise and lower the tailgate 106.

The lifting assembly 10 includes a tailgate plate 12, pivot arm 14, base 16, hydraulic cylinder 18, and a plurality of pins. The base 16 includes a first side plate 17, a second side plate 19, and a bottom plate 39. The first side plate 17 is attached to one side of the bottom plate 39 and the second side plate 19 is attached to the opposite side thereof. The second side plate 19 and bottom plate 39 are preferably fabricated from a single piece of material. The first side plate 17 preferably has a greater height than the second side 19. The portion of the first side plate 17 which extends below the bottom plate 39 facilitates, positioning and attachment of the lifting assembly 10 to a side wall of a dump box. The pivot arm 14 includes a U-bracket 35. A cutout 37 is formed in a front of the U-bracket 35. An anti-rotation plate 47 is fastened inside the U-bracket 35. The anti-rotation plate 47 prevents the tailgate plate 12 from rotating relative to the pivot arm 14.

The tailgate plate 12 is retained within the first end of the pivoting arm 14 with a removable pin 20. A bore 22 is formed through substantially the front of the pivoting arm 14 and is sized to receive the removable pin 20. The tailgate plate 12 includes a slidable tube 23. The slidable tube 23 has a slidable fit with a hole in the tailgate plate 12. The slidable tube 23 allows the tailgate plate 12 to be positioned laterally relative to the tailgate 106 for different width tailgates. Once the position of the tailgate plate 12 relative to the slidable tube 23 has been established, the slidable tube 23 is preferably welded to the tailgate plate 12. A hole 24 is formed through the tube 23 and is sized to receive the removable pin 20. Preferably, a hole 30 is formed through the removable pin 20 and a hole 25 formed through the slidable tube 23 to receive a bolt 26 and a nut 28. The removable pin is inserted through the bore 22, and the hole 24. The bolt 26 is inserted through the removable pin 20 and the slidable tube 23 to retain the tailgate plate 12. Other methods may be used to retain the removable pin 20 besides the bolt 26 and nut 28.

A bore 44 is formed through the base 16 at a rear thereof and a bore 46 is formed through the pivoting arm 14 at a rear thereof. A retention pin 42 is inserted through the bores 44 and 46. The retention pin 42 is preferably welded to the base 16 such that the pivoting arm 14 freely pivots relative to the base 16. A first flange 43 extend upwards from a front of the first side plate 17 and a second flange 45 extends upward from a front of the second side plate 19. A bore 41 is formed through the first and second flanges. The bore 41 is sized to receive a safety pin 48. The safety pin 48 is preferably inserted through the bore 41 when the tailgate 106 is an open position The safety pin 48 prevents injury from a tailgate falling on a worker in the event of a hydraulic system failure.

A first pivot tube 32 is attached to an end of the hydraulic cylinder rod 33. A second pivot tube 34 is attached to the rear end of the hydraulic cylinder 18. The inner diameter of the first and second pivot tubes are sized to receive a pivot pin 51 and pivot pin 38, respectively. A first bore 36 is formed through the pivot arm 14 at a front thereof. The first pivot pin 51 is inserted through the first bore 36 and the first pivot tube 32 to pivotally retain said hydraulic cylinder 18 in relation to said pivoting arm 14. Preferably, the first pivot tube 32 has a tapped hole 50 formed therein and the first pivot pin 51 has a shallow hole 52 formed therein. A set screw 54 or the like is threaded into the tapped hole 50 and tightened into the shallow hole 52 The pivot pin 51 is sized to freely pivot within the first bore 36.

A second bore 40 is formed through a side of the base 16 at a rear thereof. A second pivot pin 38 is inserted through the second bore 40 and the second pivot tube 34 to pivotally retain the hydraulic cylinder 18 in relation to the base 16. Preferably, the second pivot tube 34 preferably has a tapped hole formed therein and the second pivot pin 38 has a shallow hole 56 formed therein. A set screw 54 or the like is threaded into the tapped hole and tightened into the shallow hole 56. The pivot pin 38 is sized to freely pivot within the second bore 46. Actuation of the hydraulic cylinders of the pair of lifting assemblies will lift a tailgate 106. The only source of actuation that is required to open or close the tailgate 106 is the hydraulic cylinders 18. No manual intervention applied directly to the tailgate 106 is required to start the opening of the tailgate 106 or to start the closing of the tailgate 106. Each pivoting arm 14 is in a retracted position when the tailgate 106 is closed and in an extended position when the tailgate 106 is being opened.

Figure 7:
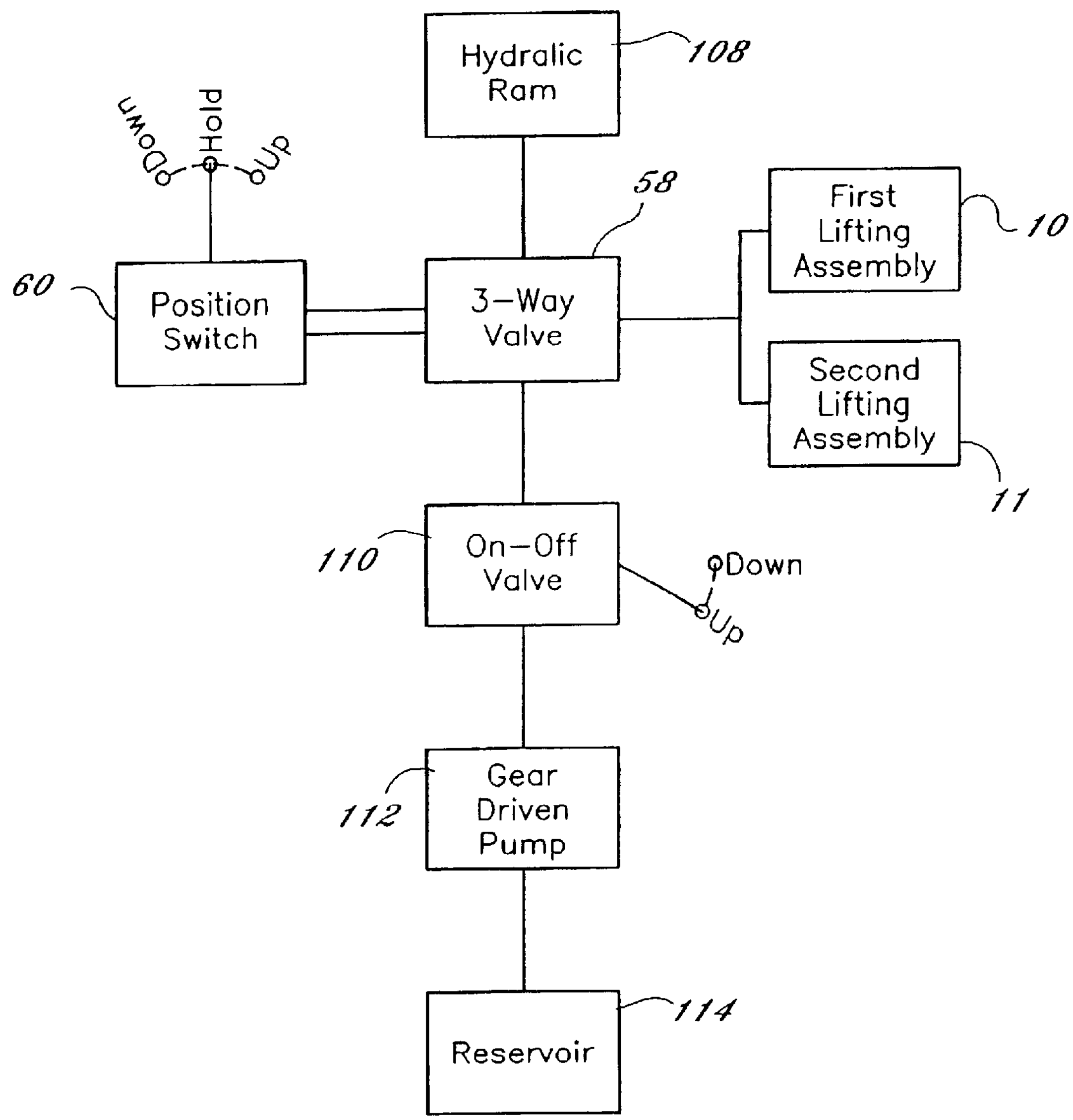
FIG. 7 is a block diagram of a hydraulic circuit used to operate a compact tailgate lifter in accordance with the present invention.

FIG. 7 shows a block diagram of a hydraulic circuit used to operate a compact tailgate lifter 1. The hydraulic circuit includes a hydraulic ram 108, three way valve 58, on-off valve 110, and a gear driven pump 112, and a reservoir 114. A solenoid position switch 60 controls the 3-way valve 58. To lift the tailgate 106, the solenoid position switch 60 is placed in an "UP" position and the switch of the on-off valve 110 is placed in an "UP" position. The position switch 60 diverts hydraulic fluid into the first and second lifting assemblies away from the hydraulic ram 108 which is used to lift the dump box 100. Once the tailgate 106 is raised to the desired position, the solenoid position switch 60 is placed in a "HOLD" position. To lower the tailgate 106, the solenoid position switch 60 is placed in a "DOWN" position, the switch of the on-off valve 110 is placed in a "DOWN" position, and the gear driven pump 112 is disengaged. The hydraulic fluid in the hydraulic cylinders will drain through the gear driven pump 112 into the reservoir 114. The gear driven pump 112 is driven by the transmission of the truck. If the truck does not have a hydraulic system, an electric motor driven hydraulic system may be used to supply pressurized hydraulic fluid.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

I claim:

1. A compact tailgate lifter in combination with a tailgate of a dump box comprising:

a first lifting assembly and a second lifting assembly, said first lifting assembly being rigidly attached to a top of a first side wall of the dump box and said second lifting assembly being rigidly attached to a top of a second side wall of the dump box;

each said lifting assembly having a base, a pivoting arm, and an actuation device, a rear of said pivoting arm being pivotally attached to a rear of said base, one end of said actuation device being pivotally attached to a front of said pivoting arm, the other end of said actuation device being pivotally attached to said rear of said base, a front of each said pivoting arm being attached to the tailgate; and a tailgate plate being removably attached to said pivoting arm on one end and to the tailgate of the dump box on the other end thereof.

2. The compact tailgate lifter in combination with a tailgate of a dump box of claim 1, further comprising:

a safety pin capable of being inserted through flanges of said base.

3. The compact tailgate lifter in combination with a tailgate of a dump box of claim 1 wherein:

said actuation device being a hydraulic cylinder.

4. The compact tailgate lifter in combination with a tailgate of a dump box of claim 3, further comprising:

a three-way hydraulic valve being used to control the flow of hydraulic fluid into each said hydraulic cylinder.

5. A compact tailgate lifter in combination with a tailgate of a dump box comprising:

a first lifting assembly and a second lifting assembly, said first lifting assembly being rigidly attached to a top of a first side wall of the dump box and said second lifting assembly being rigidly attached to a top of a second side wall of the dump box; and each said lifting assembly having a base, a pivoting arm, and an actuation device, said pivoting arm having an extended and a retracted position, a rear of said pivoting arm being pivotally attached to a rear of said base, one end of said actuation device being pivotally attached to a front of said pivoting arm below a rear pivotal attachment of said pivoting arm to said base occurring when said pivoting arm is in the retracted position, the other end of said actuation device being pivotally attached to said rear of said base below said rear pivotal attachment of said pivoting arm, a front of each said pivoting arm being attached to the tailgate, said tailgate being opened and closed without manual intervention.

6. The compact tailgate lifter in combination with a tailgate of a dump box of claim 5, further comprising:

a tailgate plate being removably attached to said pivoting arm on one end and to the tailgate of the dump box on the other end thereof.

7. The compact tailgate lifter in combination with a tailgate of a dump box of claim 5, further comprising:

a safety pin capable of being inserted through flanges of said base.

8. The compact tailgate lifter in combination with a tailgate of a dump box of claim 5, wherein:

said actuation device being a hydraulic cylinder.

9. The compact tailgate lifter in combination with a tailgate of a dump box of claim 8, further comprising:

a three-way hydraulic valve being used to control the flow of hydraulic fluid into each said hydraulic cylinder.

10. A compact tailgate lifter in combination with a tailgate of a dump box comprising:

a first lifting assembly and a second lifting assembly, said first lifting assembly being attached to a top of a first side wall of the dump box and said second lifting assembly being attached to a top of a second side wall of the dump box; and each said lifting assembly having a base, a pivoting arm, and an actuation device, a rear of said pivoting arm being pivotally attached to a rear of said base, one end of said actuation device being pivotally attached to a front of said pivoting arm, the other end of said actuation device being pivotally attached to said rear of said base, said tailgate being opened and closed without manual intervention; and a tailgate plate being removably attached to said pivoting arm on one end and to the tailgate of the dump box on the other end thereof.

11. The compact tailgate lifter in combination with a tailgate of a dump box of claim 10, further comprising:

a safety pin capable of being inserted through flanges of said base.

12. The compact tailgate lifter in combination with a tailgate of a dump box of claim 10 wherein:

said actuation device being a hydraulic cylinder.

13. The compact tailgate lifter in combination with a tailgate of a dump box of claim 12, further comprising:

a three-way hydraulic valve being used to control the flow of hydraulic fluid into each said hydraulic cylinder.

* * * * *